United States Patent
Sharman et al.

(10) Patent No.: US 9,973,777 B2
(45) Date of Patent: May 15, 2018

(54) DATA ENCODING AND DECODING APPARATUS, METHOD AND STORAGE MEDIUM

(71) Applicant: SONY CORPORATION, Tokyo (JP)

(72) Inventors: Karl James Sharman, Newbury (GB); James Alexander Gamei, Surrey (GB)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/345,702

(22) Filed: Nov. 8, 2016

(65) Prior Publication Data

US 2017/0054999 A1    Feb. 23, 2017

Related U.S. Application Data

(63) Continuation of application No. 14/315,498, filed on Jun. 26, 2014, now Pat. No. 9,521,423.

(51) Int. Cl.
| | |
|---|---|
| H04N 7/12 | (2006.01) |
| G06K 9/36 | (2006.01) |
| H04N 19/593 | (2014.01) |
| H04N 19/463 | (2014.01) |
| H04N 19/103 | (2014.01) |
| H04N 19/136 | (2014.01) |
| H04N 19/503 | (2014.01) |
| H04N 19/82 | (2014.01) |

(52) U.S. Cl.
CPC ......... *H04N 19/593* (2014.11); *H04N 19/103* (2014.11); *H04N 19/136* (2014.11); *H04N 19/463* (2014.11); *H04N 19/503* (2014.11); *H04N 19/82* (2014.11)

(58) Field of Classification Search
CPC .... H04N 19/463; H04N 19/136; H04N 19/82; H04N 19/503
See application file for complete search history.

(56) References Cited

U.S. PATENT DOCUMENTS

| | | | |
|---|---|---|---|
| 9,264,713 B2 * | 2/2016 | Joshi | H04N 19/88 |
| 2013/0101031 A1 * | 4/2013 | Van der Auwera | H04N 19/14 375/240.12 |
| 2013/0101036 A1 * | 4/2013 | Zhou | H04N 19/00569 375/240.12 |
| 2015/0016516 A1 * | 1/2015 | Saxena | H04N 19/105 375/240.12 |
| 2015/0215617 A1 * | 7/2015 | Leontaris | H04N 19/82 375/240.03 |
| 2015/0382003 A1 | 12/2015 | Gamei et al. | |
| 2016/0050427 A1 | 2/2016 | Berry et al. | |
| 2016/0286215 A1 | 9/2016 | Gamei et al. | |

* cited by examiner

*Primary Examiner* — Tsion B Owens
(74) *Attorney, Agent, or Firm* — Oblon, McClelland, Maier & Neustadt, L.L.P.

(57) ABSTRACT

A video data decoding apparatus is configured to detect a control flag associated with at least a part of an encoded image for decoding, in which in a lossless mode of operation, a first control flag state enables sample-based angular intra-prediction but disables edge filtering of prediction samples, and a second control flag state disables sample-based angular intra prediction but enables edge filtering of prediction samples; and in a lossy mode of operation, the first control flag state enables residual differential pulse code modulation coding and enables edge filtering of prediction samples, and the second control flag state disables residual differential pulse code modulation coding but enables edge filtering of prediction samples.

12 Claims, 11 Drawing Sheets

| A | B | C | D |
|---|---|---|---|
| E | F | G | H |
| I | J | K | L |
| M | N | O | P |

| A | B-A* | C-B* | D-C* |
|---|---|---|---|
| E | F-E* | G-F* | H-G* |
| I | J-I* | K-J* | L-K* |
| M | N-M* | O-N* | P-O* |

DATA ENCODING AND DECODING APPARATUS, METHOD AND STORAGE MEDIUM

CROSS-REFERENCE TO RELATED APPLICATIONS

This application is a continuation application of U.S. application Ser. No. 14/315,498 filed Jun. 26, 2014, the entire content of which is herein incorporated by reference in its entirety for all purposes.

FIELD OF THE DISCLOSURE

This disclosure relates to data encoding and decoding.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

The transformation into the spatial frequency domain at the encoder side corresponds to an inverse transformation at the decoder side. Example transformations include the so-called discrete cosine transformation (DCT) and the so-called discrete sine transformation (DST). In some examples the transformations are carried out by matrix-multiplying an array of input samples (derived from the video data to be coded) by a matrix of transformation coefficients to generate frequency-transformed data. Frequency-transformed data is converted back to sample data, from which output video data can be derived, by matrix-multiplying an array of the frequency-transformed data by a matrix of inverse-transformation coefficients.

SUMMARY

An aspect of this disclosure is defined by claim 1.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein.

DESCRIPTION OF THE EMBODIMENTS

Figure 1:
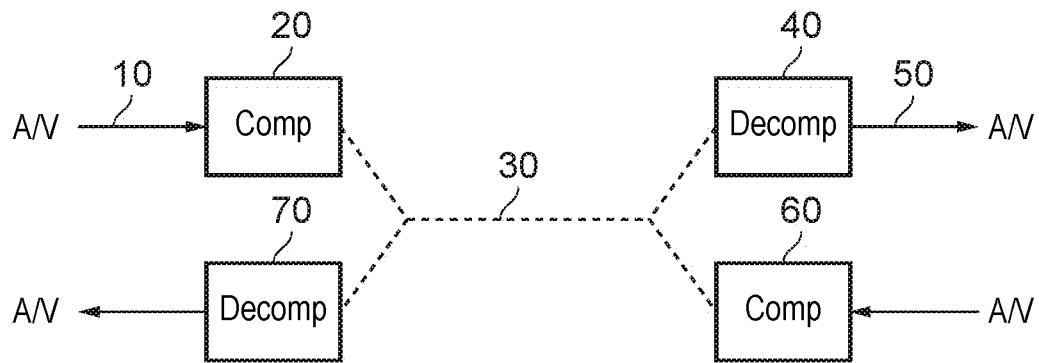
FIG. 1 schematically illustrates an audio/video (A/V) data transmission and reception system using video data compression and decompression.

Referring now to the drawings, FIGS. 1-4e are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is unidirectional, only one of the nodes would require a compression apparatus and the other node would only require a decompression apparatus.

Figure 2:
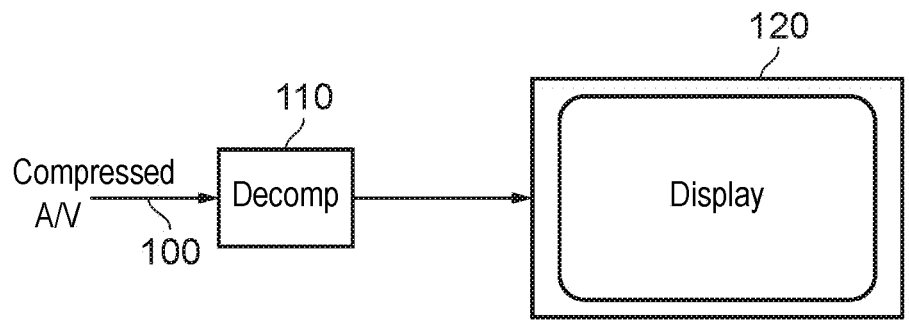
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
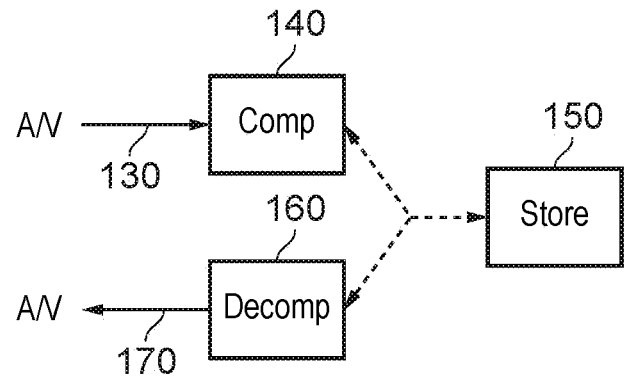
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. Reference is made to FIGS. 4d and 4e described below.

Figure 4A:
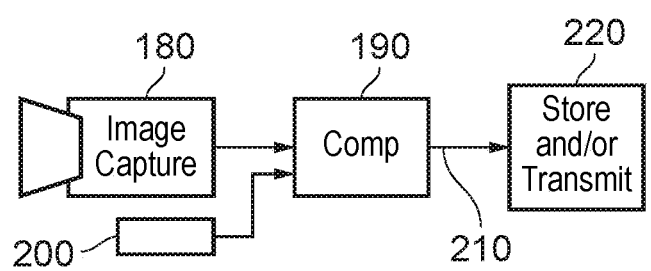
FIG. 4a schematically illustrates a video camera using video data compression.

FIG. 4a schematically illustrates a video camera using video data compression. In FIG. 4a, and image capture device 180, such as a charge coupled device (COD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. 1-4e) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
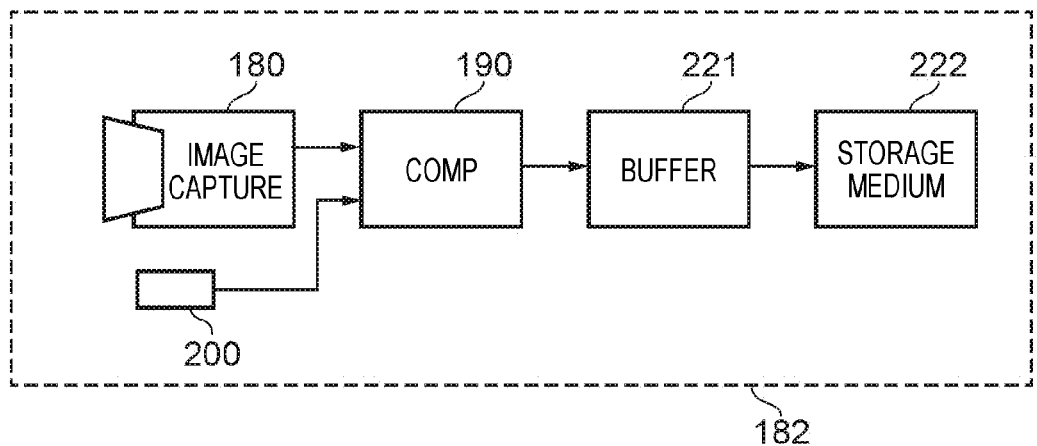
FIG. 4b schematically illustrates an example video camera in more detail.

FIG. 4b schematically illustrates an example video camera apparatus 183 in more detail. Those features numbered in common with FIG. 4a will not be described further. FIG. 4b is an example of the camera of FIG. 4a (in the case that the unit 220 of FIG. 4a provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4b can be implemented as a single (physical) unit 182.

Figure 4C:
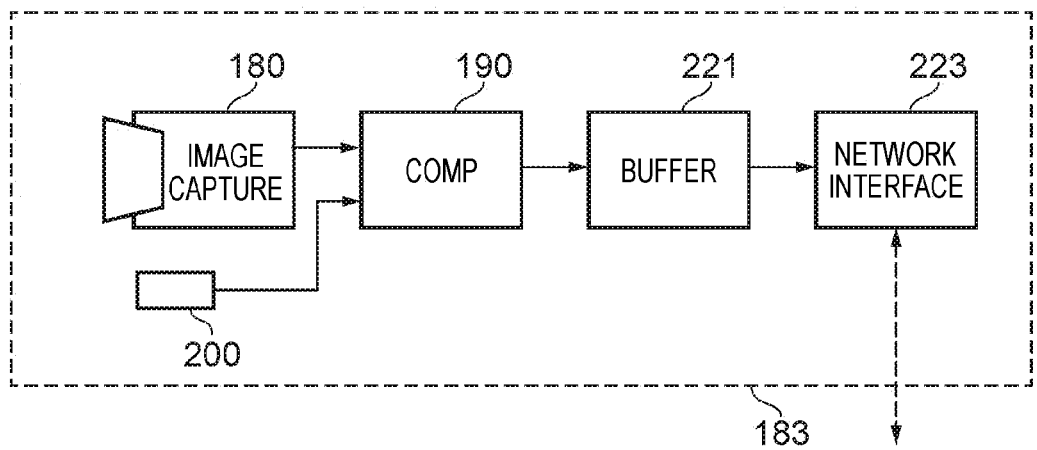
FIG. 4c schematically illustrates another example video camera.
Figure 4D:
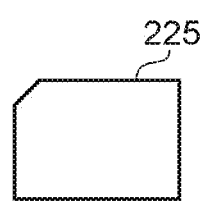
FIGS. 4d and 4e schematically illustrate date carriers.
Figure 4E:
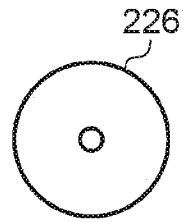

FIG. 4c schematically illustrates another example video camera in which, in place of the storage arrangement of FIG. 4b, a network interface 223 is provided in order to allow the compressed data to be transmitted to another unit (not shown). The network interface 223 can also allow for incoming data to be received by the video camera, such as control data. Note that the arrangement of FIG. 4b can be implemented as a single (physical) unit 183.

FIGS. 4d and 4e schematically illustrate data carriers, for example for use as the storage medium 222 and carrying compressed data which has been compressed according to the compression techniques described in the present application. FIG. 4d shows a schematic example of a removable non-volatile storage medium 225 implemented as solid state memory such as flash memory. FIG. 4e shows a schematic example of a removable non-volatile storage medium 226 implemented as a disk medium such as an optical disk.

Figure 5:
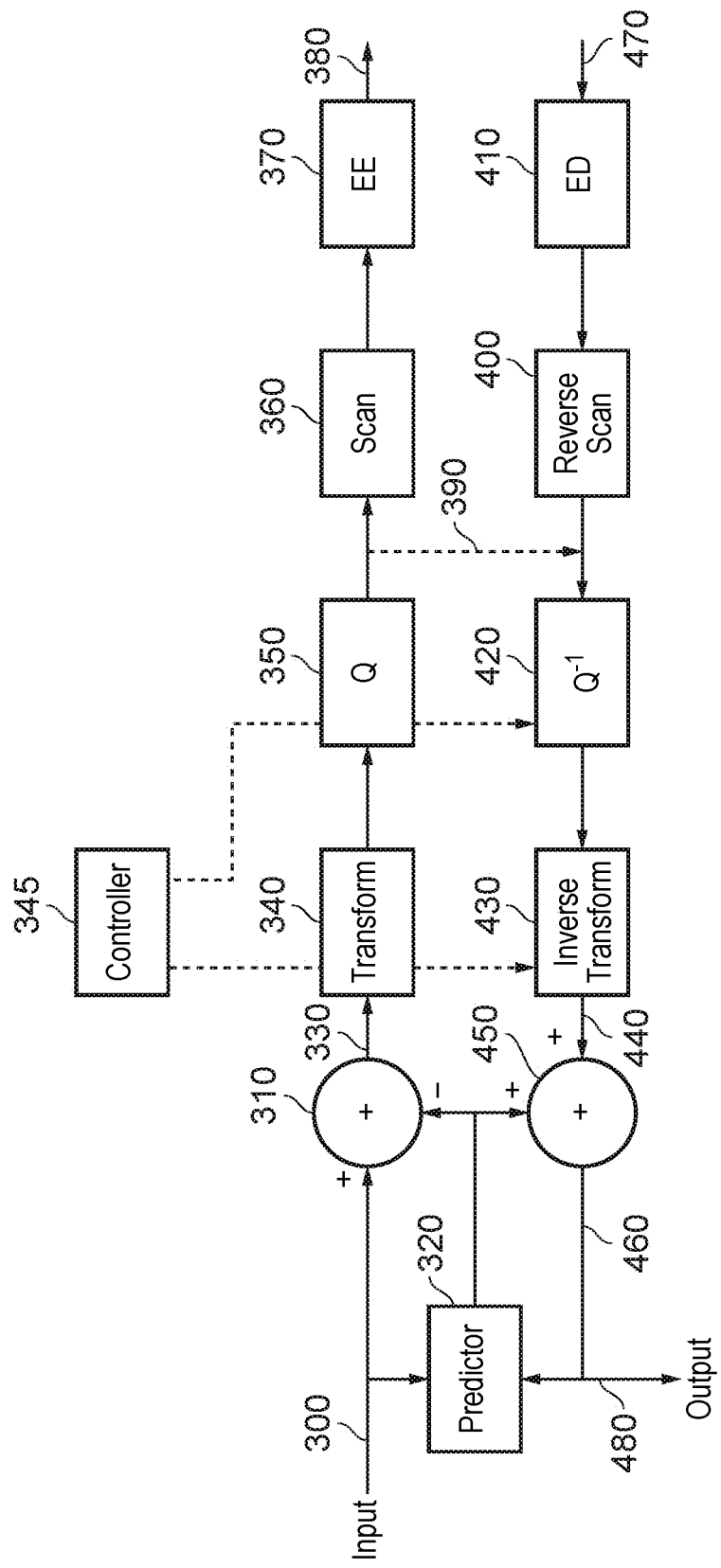
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "−" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below, in particular relating to the selection of different blocks of data to which the DCT operation is applied. These will be discussed with reference to FIGS. 7-12 below.

Note that in some embodiments, a discrete sine transform (DST) is used instead of a DCT. In other embodiments, no transform might be used. This can be done selectively, so that the transform stage is, in effect, bypassed, for example under the control of a "transform skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A controller 345 controls the operation of the transform unit 340 and the quantiser 350 (and their respective inverse units), according to techniques to be discussed further below. Note that the controller 345 may also control other aspects of the operation of the apparatus of FIG. 5.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Figure 6:
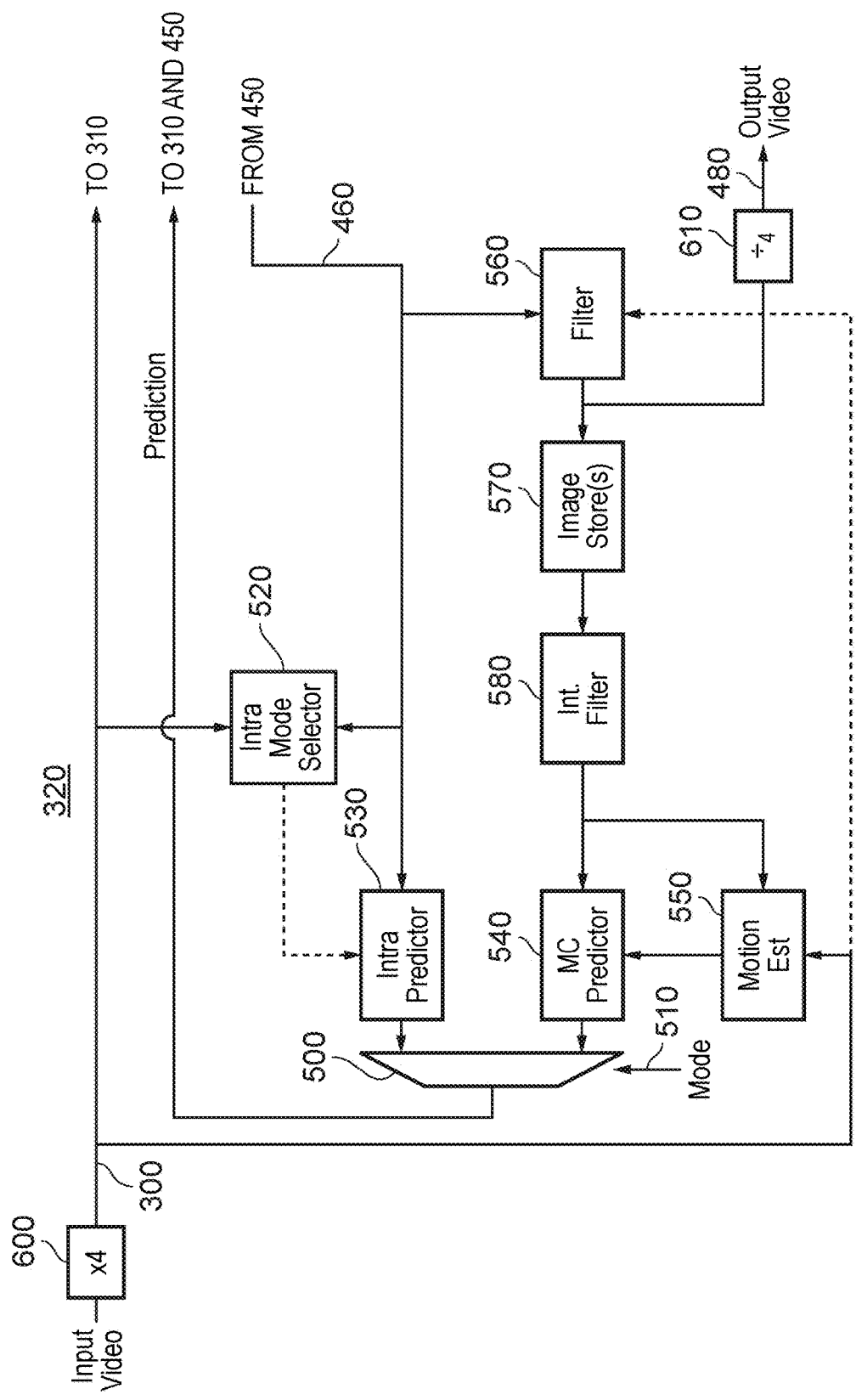
FIG. 6 schematically illustrates the generation of predicted images.
Figure 7:
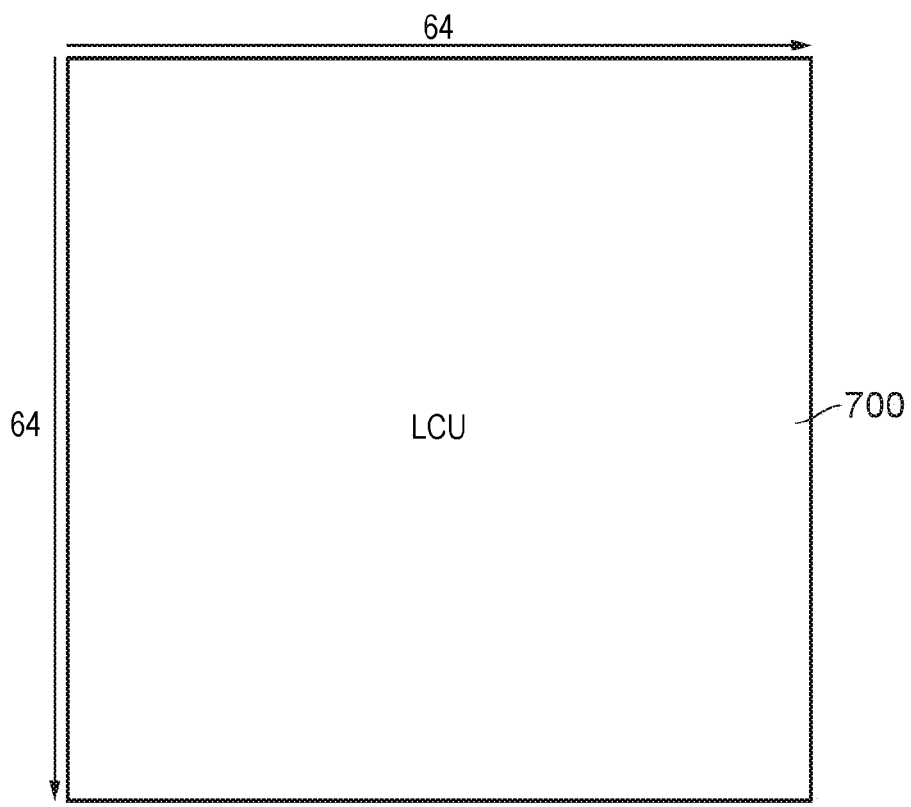
FIG. 7 schematically illustrates a largest coding unit (LCU)

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output data stream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves selectively applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output data stream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
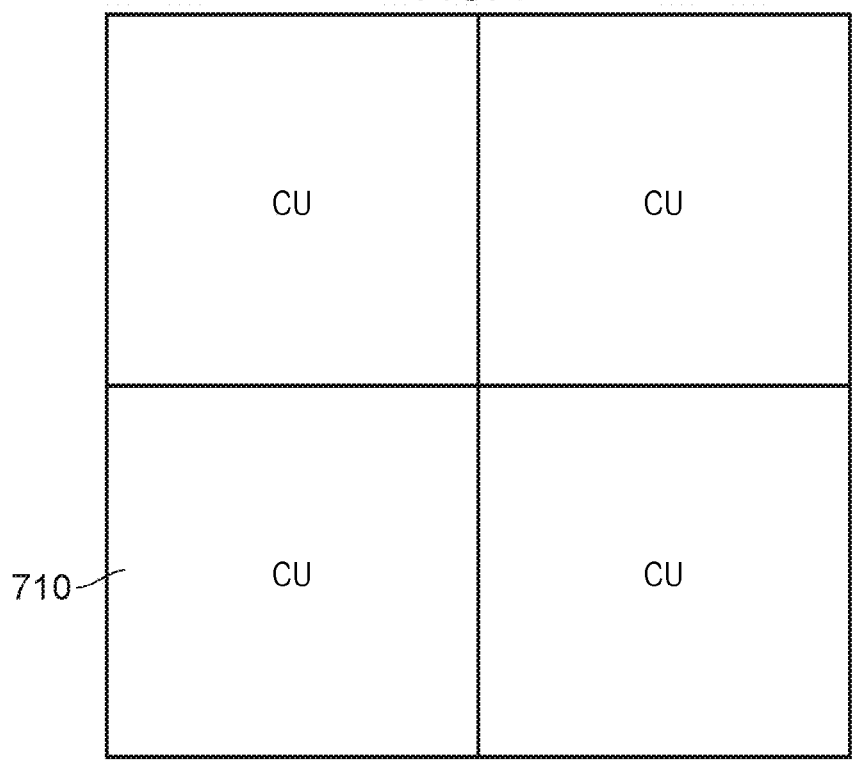
FIG. 8 schematically illustrates a set of four coding units (CU)
Figure 9:
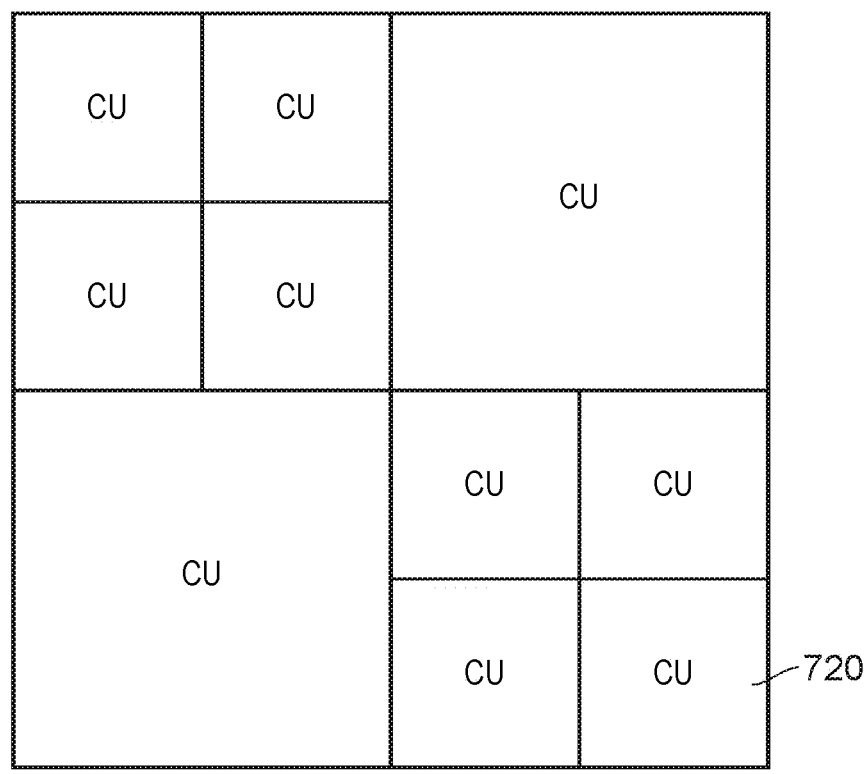
FIGS. 9 and 10 schematically illustrate the coding units of FIG. 8 sub-divided into smaller coding units.
Figure 10:
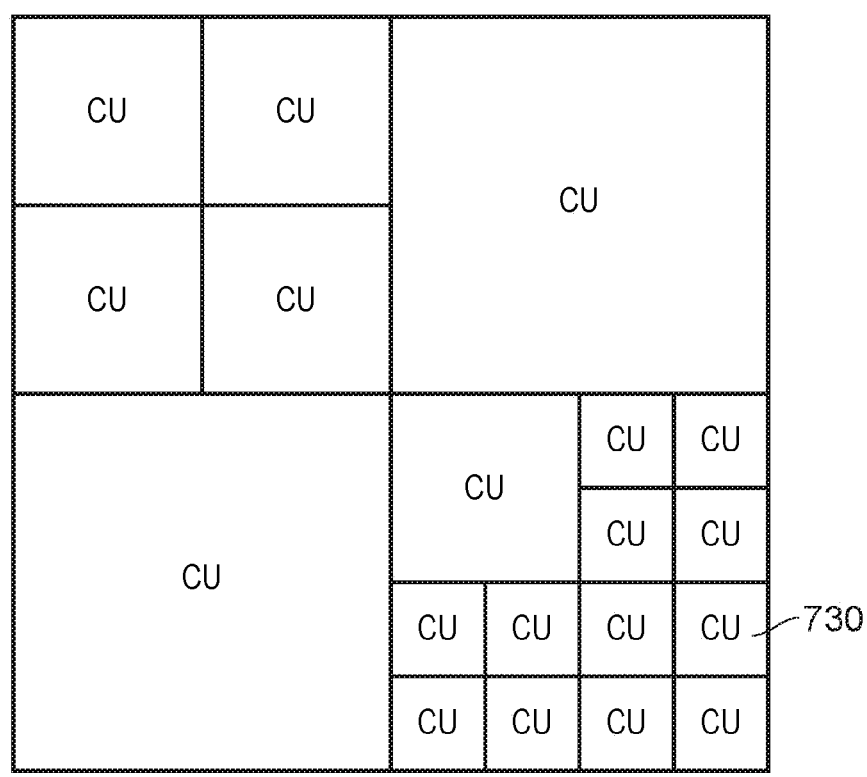

The LCU may be subdivided into so-called coding units (CU). Coding units are always square and have a size between 8×8 samples and the full size of the LCU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the LCU or as small as 8×8 samples. Encoding of the output video data takes place on the basis of the coding unit structure.

Figure 11:
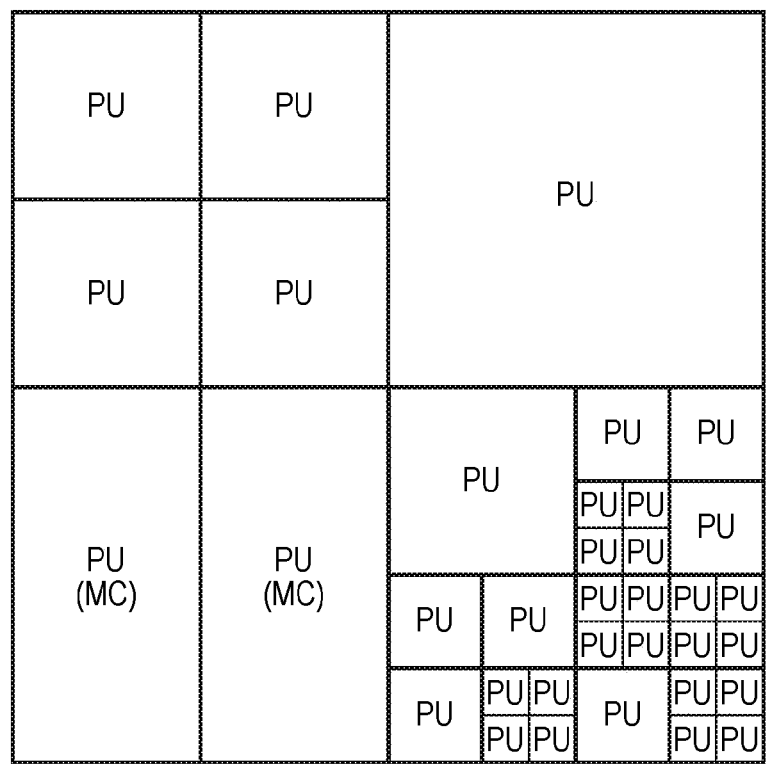
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
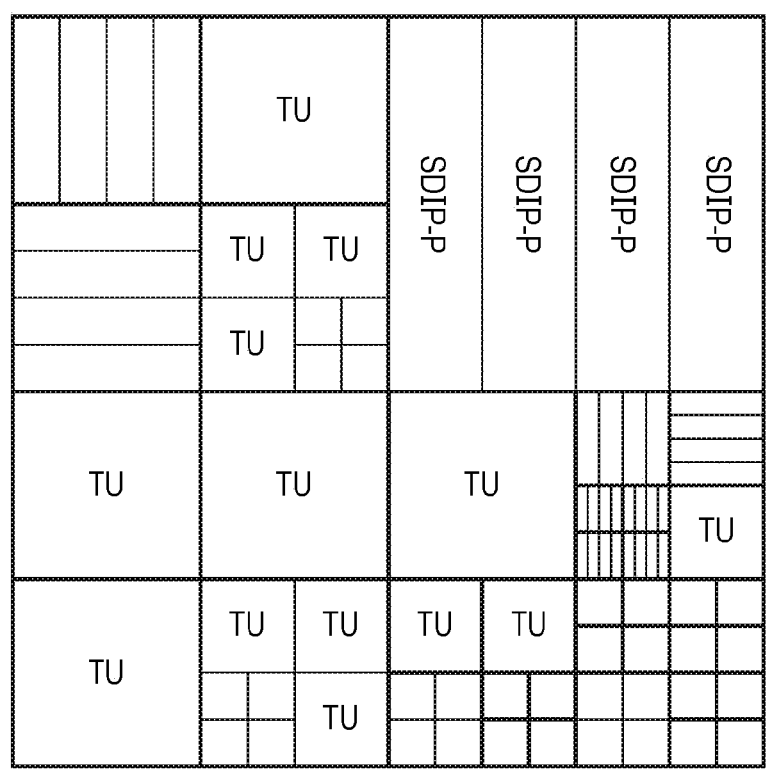
FIG. 12 schematically illustrates an array of transform units (TU)

FIG. 12 schematically illustrates an array of transform units (TU). A transform unit is a basic unit of the transform and quantisation process. Transform units are always square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

Figure 13:
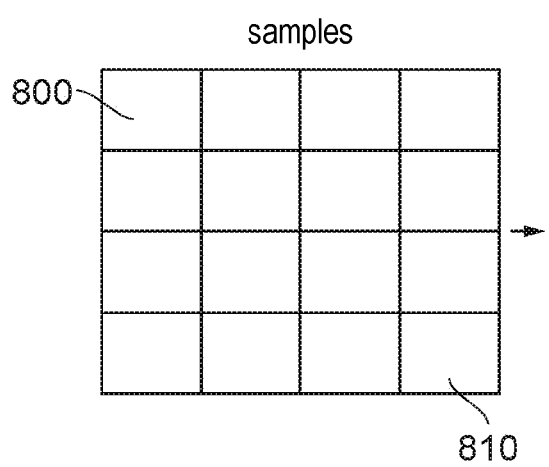
FIG. 13 schematically illustrates an array of samples.

FIG. 13 schematically illustrates an array of samples. These in fact represent samples of the residual image 330 discussed above, and are drawn at their appropriate relative spatial positions, which is to say that a sample 800 lies at the upper left corner of an array of 4×4 adjacent samples, and a sample 810 lies at the bottom right corner of such an array, with respect to positions of those samples within an image.

It will of course be appreciated that the 4×4 array of FIG. 13 is just an example; the techniques and attributes discussed here can apply to arrays of various different sizes such as 8×8, 16×16, 32×32 and so on.

Figure 14:
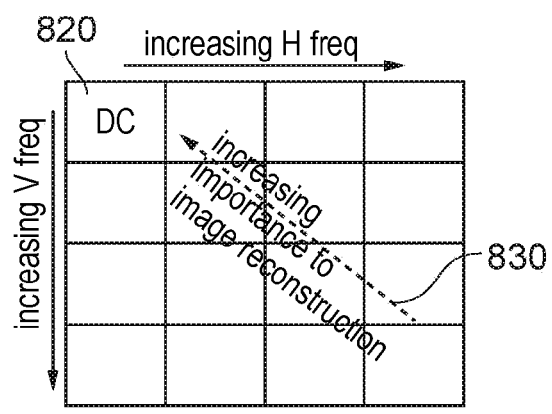
FIG. 14 schematically illustrates an array of frequency-separated coefficients.

The samples of FIG. 13 are processed by the transform unit 340 to generate frequency-separated coefficients, FIG. 14 schematically illustrates an array of such frequency-separated coefficients. Here, the position of a coefficient within the array represents the spatial frequencies corresponding to that coefficient. By convention, a so-called DC coefficient 820 occupies the upper-left array position. Moving towards the right within the array of FIG. 14 indicates an increasing horizontal frequency component, and moving towards the bottom of the array of FIG. 14 indicates an increasing vertical frequency component. Note that although it is just a convention to represent the array of coefficients in this manner (rather than, for example, having the DC coefficient in the bottom-right corner), the ordering of the coefficients is technically relevant to other parts of the process. One reason for this is schematically illustrated by a broken-line arrow 830 in FIG. 14, which indicates that moving from the bottom-right to the top-left positions within the array of FIG. 14 corresponds to a generally increasing importance of the coefficients to image reconstruction. That is to say, in order to reconstruct the array or block of samples of FIG. 13, the most important one of the coefficients of FIG. 14 is the DC coefficient 820, followed in terms of importance by the lower horizontal and vertical frequency coefficients.

Figures 15, 16, 17:
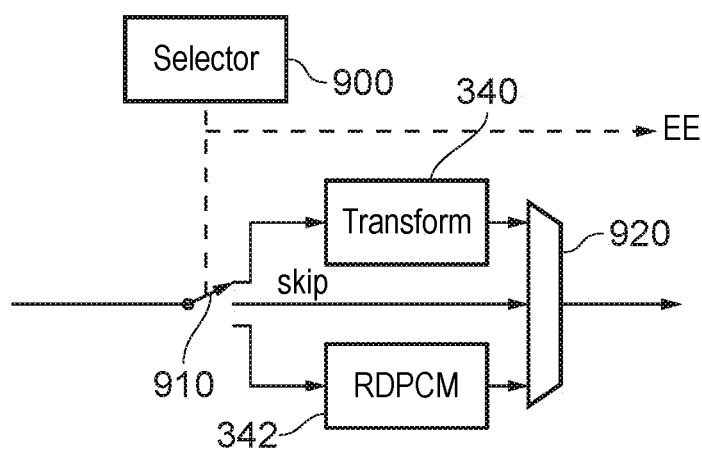
FIG. 15 schematically illustrates part of an encoder.
FIGS. 16 and 17 schematically illustrate an RDPCM operation.

In general terms, this trend of importance can also correspond to a trend in terms of coefficient magnitude, in that the magnitude of the DC coefficient can tend to be the largest within the set of coefficients derived from a block of samples. FIG. 15 schematically illustrates such a trend within the array of FIG. 14, in which smaller values tend to be towards the lower right of the array and larger values tend to be towards the upper left of the array. Of course, a specific individual array of coefficients may differ from this general trend.

FIG. 15 schematically illustrates part of an encoder and represents a modification of the operation of the transform unit 340 of FIG. 5. Note that a corresponding modification would be provided to the inverse transform unit 430.

A selector 900, which may in fact be implemented as part of the functionality of the controller 345, is provided to select (using a schematic switch 910) between three modes of operation, namely a mode in which a frequency transform is used (routing the data via the transform unit 340), a transform skip mode in which no transform is employed, and a so-called RDPCM (residual differential pulse code modulation) mode using an RDPCM unit 342. Data which has been handled by any of the three routes is combined by an output multiplexer 920. Note that the selector 900 may also control part of the operation of the entropy encoder 370; this feature will be discussed further below. Note also that the transform operation can be omitted in a so-called trans-quant bypass mode, in which neither the transform nor the quantisation operations are applied.

FIGS. 16 and 17 schematically illustrate an RDPCM operation. The operation is applied to a block of residual data 330, an example of which is schematically illustrated in FIG. 16. In FIG. 16, an example block of 4×4 samples is used, but the techniques are applicable to other block sizes. Each sample in the block is given a unique letter reference from A to P in order that the effect of the RDPCM process may be illustrated in FIG. 17.

RDPCM may be applied in a horizontal (left to right) sense or a vertical (top to bottom) sense. FIG. 17 schematically illustrates the horizontal RDPCM process, but it will be appreciated that the same techniques are applicable to the vertical process.

Referring to FIG. 17, a left-hand column of samples (A, E, I, M) remain unchanged by the coding process. After that, each successive sample along a row is encoded in terms of the difference between that sample and a reconstructed version of the sample to its left. Here, the term "reconstructed" refers to the value of that sample after it has been encoded and then decoded (so that both the encode and decode are working with respect to data available to the decoder). An asterisk (*) is used to signify a reconstructed version of a sample so that, for example, B*represents a reconstructed version of the sample B. So, the sample B is encoded by the value (B−A*), the sample K is encoded by the value (K−J*) and so on.

RDPCM coding can be used in intra-image-encoding or inter-image-encoding. In examples of the HEVC system, in intra-image-encoding, horizontal RDPCM is used in a horizontal prediction mode, which in turn determines the scan order as a reverse vertical scan, and vertical RDPCM is used in a vertical prediction mode, which again in turn determines this can order as a reverse horizontal scan. In inter-image-encoding, either horizontal or vertical RDPCM may be selected (for example, by the control at 345 in response to calculation of a cost function) and the scan mode is always reverse diagonal.

A similar technique to RDPCM is that of sample based angular intra-prediction (SAIP) which has been proposed, for example in US 20130101036 A1 (the contents of which are incorporated herein by reference). In this technique a predicted sample is generated by reference to an interpolation or similar relationship to one or more adjacent samples. The direction of the adjacent samples can be determined by the current prediction direction.

The selection of RDPCM, SAIP or other intra-prediction techniques, which may include as possible techniques a so-called intra-block-copy (IBC) encoding, is made at the encoder. IBC represents a hybrid of inter- and intra-encoding, such that a block is generated by copying another block from another position within the same image, according to a displacement which may be considered to be similar in some respects to a motion vector. The encoder (for example, the controller 345) can carry out one or more trial encodings (or at least trial derivations of the amount of data and/or the error rate and/or some other cost function) which would result from encoding the image, or a particular block, using the various techniques. On the basis of an analysis of such a cost function, the encoder selects the appropriate encoding technique in respect of each block.

A proposal is that SAIP is used only in respect of a lossless mode of operation. That is not to say that every losslessly-encoded block must use SAIP, but rather than SAIP may not be used other than in a lossless mode of operation. Similarly, a proposal is that RDPCM is used only in respect of a lossy mode of operation. Once again, that is not to say that every lossy-encoded block must use RDPCM, but rather that RDPCM may not be used other than in a lossy mode of operation.

Here, a lossy mode makes use of techniques such as quantisation which deliberately discard some of the information content of the original data, generally with the overall aim that the information content is discarded in such a way as not to be noticeable, or at least to have a generally even effect across the images which provides as little objective disturbance to the decoder and subjective disturbance to the viewer as possible given the amount of information which is being discarded. In a lossy mode, the reconstructed data at the decoder is intended to be a good approximation to, but not an exact reproduction of, the original data provided to the encoder. In contrast, in a lossless mode, techniques such as quantisation are not used. The data reconstructed by the decoder is an exact replica of the data originally supplied to the encoder. In the case of a data compression system such as HEVC which is based around encoding residual differences from a predicted version of an image which in turn is based on reconstructed reference samples, it is noted that the reference samples used in a lossless mode will be exact versions of the corresponding samples of the originally encoded images.

Various stages of sample filtering relevant to the use of RDPCM and SAIP (and indeed to other modes of intra operation) will now be discussed.
 a) a so-called intra reference sample smoothing filter operates on reference samples from which other samples will be derived in intra-prediction. It is generally considered not be needed in a lossless mode of operation, because the reference samples are deemed to be perfect, having suffered no degradation or loss in the encoding/decoding process. An encoder flag is provided to allow the use of this filter to be enabled or disabled by instruction of the encoder. If the intra reference sample smoothing filter is in use, it may be further gated in its operation by the prediction direction and block size, such that it is used only for a subset of possible prediction directions and/or a subset of possible block sizes.
 b) an edge filter operates to filter block edges within data from which intra-predicted samples will be derived, so as to generally increase the extent to which the block edges are smooth and continuous. This is used only in horizontal and vertical prediction modes. In modes representing other directions of prediction, this filter is not used, nor is it used for chroma prediction or for larger block sizes.
 c) a DC filter is used in DC mode (that is to say, not horizontal, not vertical and not directional prediction). The DC mode uses as inputs all of the reference samples around a current block and takes an average, setting the predicted value of each sample in the block to be the average value of those reference samples. For predicted samples at the left and top edges, a filter is applied to blend with the neighbouring reference samples.

In connection with the filtering stage as discussed above, particular reference will now be made to the edge filter (b).

In particular, in embodiments of the present disclosure, a single encoder flag to be referred to as the intra_RDPCM_enable flag, is provided to indicate a mode of operation from the encoder to the decoder. The interpretation of this flag at the decoder depends upon whether the current mode of operation is lossy or lossless:
 i. When the intra_RDPCM_enable flag is enabled in a lossless mode, the decoder is instructed to use sample-based angular intra-prediction (SAIP) but to disable the edge filter discussed above.
 ii. When the intra_RDPCM_enable flag is not enabled in a lossless mode, the decoder is instructed not to use sample-based angular intra-prediction but to enable use of the edge filter.
 iii. When the intra_RDPCM_enable flag is enabled in a lossy mode, the decoder is instructed to enable use of the edge filter and to use RDPCM,
 iv. When the intra_RDPCM_enable flag is not enabled in a lossy mode, the decoder is instructed to use the edge filter but not to use RDPCM.

Advantageously, embodiments of the present disclosure conveniently allow a single flag not only to control the use, by the decoder, of RDPCM, but also to control the use of sample-based angular intra-prediction and the edge filter. Previously proposed systems used separate flags for enabling and disabling sample-based angular intra-prediction and for enabling and disabling RDPCM. Accordingly, the advantageous use of a single flag is not only more convenient but also can reduce the data overhead involved in signalling between the encoder and decoder.

Figure 18:
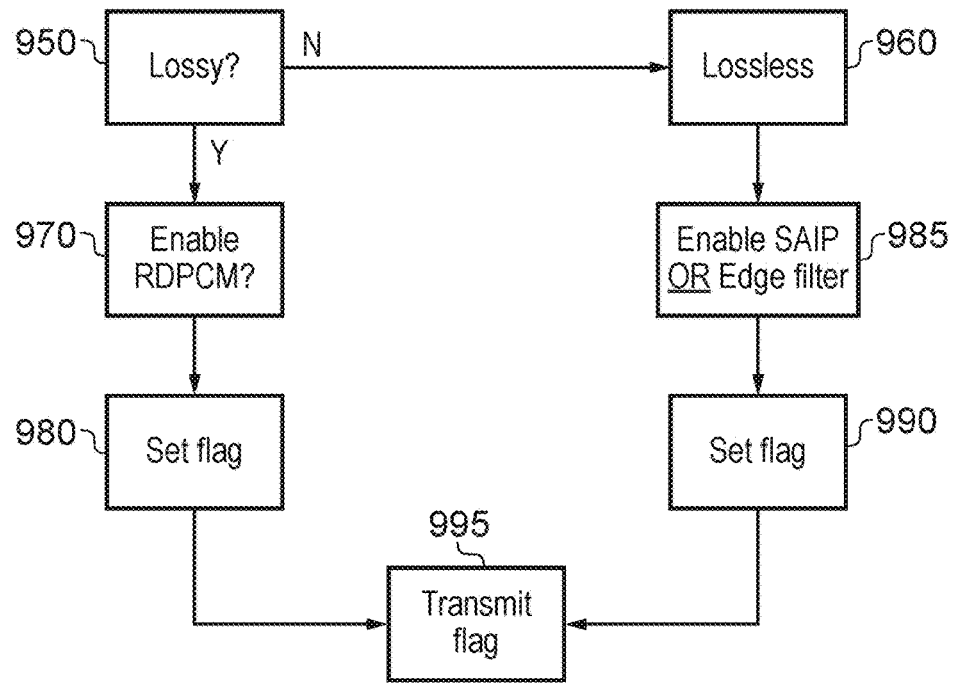
FIG. 18 is a schematic flowchart illustrating operations of a encoder.

FIG. 18 is a schematic flowchart illustrating operations of an encoder, in order to generate or provide the intra_RDPCM_enable flag. Such an encoder may be implemented as, for example, the encoder shown in FIG. 5. The operations shown schematically in FIG. 18 may be implemented by, for example, the controller 345.

At a step 950, the encoder detects whether its current mode of operation is a lossy mode. If so, control passes to a step 970. If not, control passes to a step 960. Having said this, the step 950 (and indeed the step 960) are shown for the purposes of a schematic explanation, but in practice, a real implementation of an encoder would be expected just to act in accordance with its current mode, which is to say by proceeding directly to either the step 970 or to a (lossless mode) step 985 in dependence upon its current mode of operation.

If the current mode is lossy, then at the step 970, the encoder determines whether or not to enable RDPCM operation in respect of a current block, slice, picture or stream. The encoder sets the intra_RDPCM_enable flag at a step 980 in response to this determination.

Turning to the step 960, corresponding to a lossless mode, at a subsequent step 985, the encoder determines whether to enable sample-based angular intra-prediction (SAIP) or to enable edge filtering. The encoder sets the intra_RDPCM_enable flag at a step 990 in response to this determination.

The steps 970 and 985 can, as discussed above, involve the controller 345 in controlling operation of the encoder to carry out one or more trial encodings, or analysis relating to the amount of data and/or another cost function which would apply if the data were encoded using that technique.

At a step 995, the encoder transmits the flag, for example as part of the data stream corresponding to the encoded video data.

Accordingly, FIG. 18 provides an example of a video data encoding method comprising: generating (the steps 980, 990) a control flag associated with at least a part of an encoded image, by: setting a first control flag state in a lossless mode of operation to enable sample-based angular intra-prediction but to disable edge filtering of prediction samples; and setting a second control flag state in the lossless mode of operation to disable sample-based angular intra prediction but to enable edge filtering of prediction samples (both relating to the step 985); setting the first control flag state in a lossy mode of operation to enable residual differential pulse code modulation coding and to enable edge filtering of prediction samples; and setting the second control flag state in the lossy mode of operation to disable residual differential pulse code modulation coding but to enable edge filtering of prediction samples in response to the second control flag state (both relating to the step 970).

Figure 19:
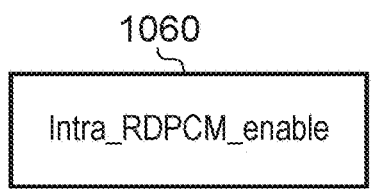
FIG. 19 schematically illustrates a flag.

As discussed above, the selections of modes of operation underlying that represented by the flag may be chosen by the controller 345 based upon one or more trial encodings, part encodings or other analysis. The flag may be incorporated within control data relating to a block, a slice, an image, a sequence or a stream. FIG. 19 provides an example 1060 of such a flag. It will be understood that the exact polarity of such a flag (whether a particular flag value such as "1" represents the flag being enabled or the flag being disabled, or even if more than one data bit is used to encode the flag) is not technically significant to the present disclosure. Nevertheless, in an example system, a data value of "1" indicates an enabled flag.

Figure 20:
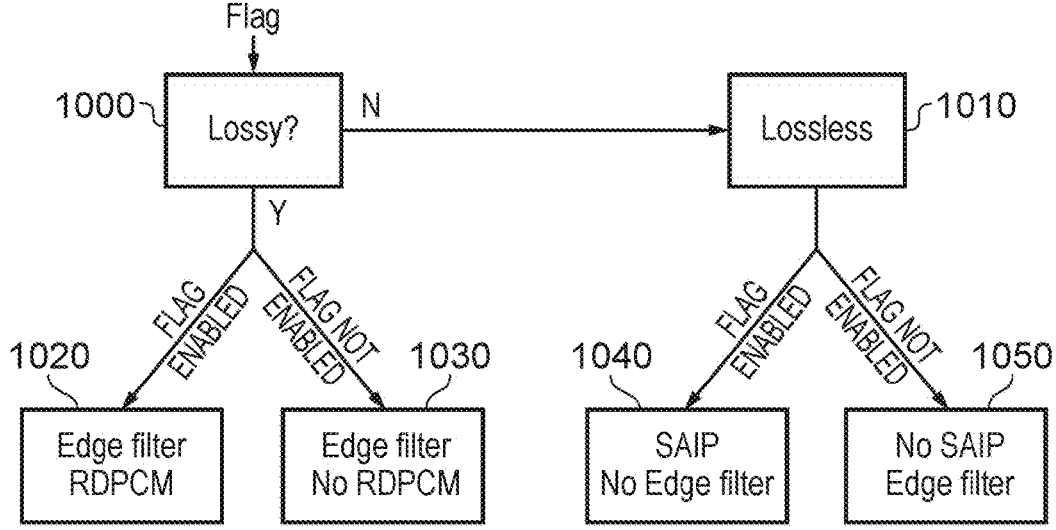
FIG. 20 is a schematic flowchart illustrating operations of a decoder.

FIG. 20 is a schematic flowchart illustrating operations of a decoder, in response to receipt of the intra_RDPCM_enable flag. As discussed, a decoder may be implemented using the same components and techniques as the decoding path of an encoder such as that shown in FIG. 5. The operations shown schematically in FIG. 20 may be implemented by, for example, the controller 345.

At a step 1000, the decoder detects whether its current mode of operation is a lossy mode. If not, control passes to a step 1010 to be discussed below. If however the mode is lossy, then, depending on the state of the intra_RDPCM_enable flag, control passes either to a step 1020 or to a step 1030. At the step 1020, if the intra_RDPCM_enable flag is enabled, the edge filter is enabled and RDPCM is also enabled. If not, then at the step 1030 corresponding to the intra_RDPCM_enable flag not being enabled, the edge filter is still enabled but RDPCM is not enabled.

Turning to the step 1010, corresponding to a lossless mode, depending on the state of the intra_RDPCM_enable flag, control passes either to a step 1040 or to a step 1050. At the step 1040, if the intra_RDPCM_enable flag is enabled then sample-based angular intra-prediction is enabled but edge filtering is not enabled. On the other hand, at the step 1050, if the intra_RDPCM_enable flag is not enabled, then sample-based angular intra-prediction is not enabled but edge filtering is enabled.

Accordingly, FIG. 20 provides an example of a video data decoding method comprising: detecting a control flag associated with at least a part of an encoded image for decoding (at the input to the step 1000); in a lossless mode of operation (the steps 1010 to 1050), enabling (1040) sample-based angular intra-prediction but disabling edge filtering of prediction samples in response to a first control flag state; in the lossless mode of operation, disabling (1050) sample-based angular intra prediction but enabling edge filtering of prediction samples in response to a second control flag state; in a lossy mode of operation (the steps 1000-1030), enabling (1020) residual differential pulse code modulation coding and enabling edge filtering of prediction samples in response to the first control flag state; and in the lossy mode of operation, disabling (1030) residual differential pulse code modulation coding but enabling edge filtering of prediction samples in response to the second control flag state.

Figure 21:
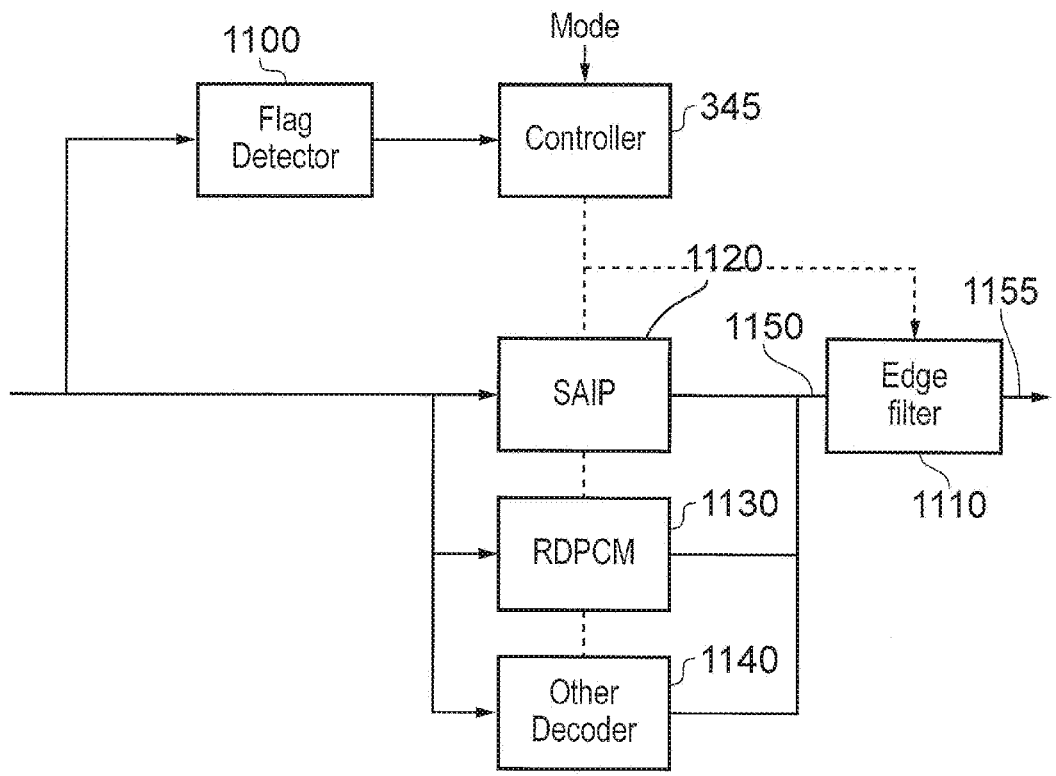
FIG. 21 schematically illustrates a part of a decoder.

FIG. 21 schematically illustrates a part of a decoder (or indeed the decoding path of an encoder). Video data for decoding is provided to a flag detector 1100 which detects a control flag present in or associated with the video data. In this example, the control flag is the intra_RDPCM_enable flag discussed above. The flag detector 1100 passes information to a controller (such as the controller 345 discussed above) indicative of the state (enabled or disabled) of the intra_RDPCM_enable flag. The controller 345 is also responsive to the current mode (lossy or lossless) of the encoder.

In response to the state of the control flag, the controller 345 controls operation of an edge filter 1110, a sample-based angular intra-prediction decoder 1120, a residual differential pulse code modulation decoder 1130 and one or more other decoders 1140 which, according to the control and enablement of the controller 345, act upon the encoded data to generate output data 1150 which is then (again, according to the control and enablement of the controller 345) filtered by the edge filter 1110.

Note that it is not essential that a decoder can operate in both a lossy and a lossless mode, just that it is responsive to the control flag in accordance with its mode of operation. Accordingly, it is not essential that the decoder contains both the SAIP decoder 1120 and the RDPCM decoder 1130, as long as it responds to the control flag according to the parameters set out above.

Accordingly, this arrangement provides an example of a video data decoding apparatus operable to detect a control flag associated with at least a part of an encoded image for decoding, in which: in a lossless mode of operation, a first control flag state enables sample-based angular intra-prediction but disables edge filtering of prediction samples, and a second control flag state disables sample-based angular intra prediction but enables edge filtering of prediction samples; and in a lossy mode of operation, the first control flag state enables residual differential pulse code modulation coding and enables edge filtering of prediction samples, and the second control flag state disables residual differential pulse code modulation coding but enables edge filtering of prediction samples.

In embodiments, the apparatus comprises an edge filter 1110; and a controller 345 responsive to the detection of the control flag to enable or disable the edge filter.

In embodiments, the apparatus comprises a residual differential pulse code modulation decoder (1130); and the controller is responsive to the detection of the control flag to enable or disable the residual differential pulse code modulation decoder.

In embodiments, the apparatus comprises a sample-based angular intra-prediction decoder (1120); and the controller is responsive to the detection of the control flag to enable or disable the sample-based angular intra-prediction decoder.

Figure 22:
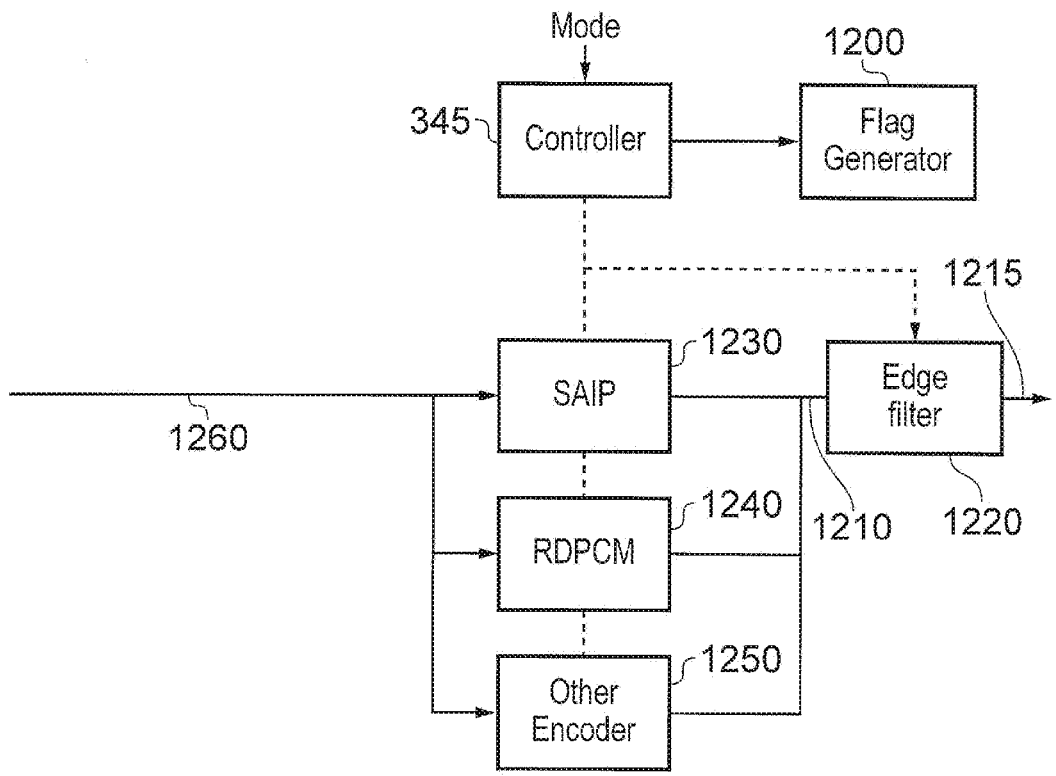
FIG. 22 schematically illustrates a part of an encoder.

FIG. 22 schematically illustrates a part of an encoder.

A controller such as the controller 345, which is responsive to a current lossy or lossless mode, determines whether or not to enable SAIP, RDPCM and edge filtering, for example by means of trial encodings or other analysis. The controller 345 passes information to a flag generator 1200 which generates a control flag (in particular, the intra_RDPCM_enable flag discussed above) for insertion (for example, by the controller or by the flag generator) into an output data stream 1215. The controller 345 also controls operation of an edge filter 1220, an SAIP encoder 1230, an RDPCM encoder 1240 and possibly one or more other encoders 1250, all to act upon an input video signal 1260. In particular, selected encoder generates an encoded signal 1210 which, according to the control and enablement of the controller 345, is acted upon by the edge filter 1220 to generate the output data stream 1215.

FIG. 22 therefore provides an example of a video data encoding apparatus operable to generate a control flag for associating with at least a part of an encoded image, in which: in a lossless mode of operation, a first control flag state enables sample-based angular intra-prediction but disables edge filtering of prediction samples, and a second control flag state disables sample-based angular intra prediction but enables edge filtering of prediction samples; and in a lossy mode of operation, the first control flag state enables residual differential pulse code modulation coding and enables edge filtering of prediction samples, and the second control flag state disables residual differential pulse code modulation coding but enables edge filtering of prediction samples.

In embodiments, the apparatus comprises an edge filter (1220); and a controller (345) responsive to the detection of the control flag to enable or disable the edge filter.

In embodiments, the apparatus comprises a residual differential pulse code modulation encoder (1240): and in which the controller is responsive to the detection of the control flag to enable or disable the residual differential pulse code modulation encoder.

In embodiments, the apparatus comprises a sample-based angular intra-prediction encoder (1230); and the controller is responsive to the detection of the control flag to enable or disable the sample-based angular intra-prediction encoder.

FIGS. 1 to 4E provide video processing, capture, storage and/or transmission apparatus comprising such apparatus.

Data Signals

It will be appreciated that data signals generated by the variants of coding apparatus discussed above, and storage or transmission media carrying such signals, are considered to represent embodiments of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

All of the techniques described above have application in encoding apparatus and methods, and/or in decoding apparatus and methods. Techniques discussed in relation to encoding have corresponding features on the decoding side. Techniques discussed in relation to decoding have application in the decoding path of the encoder. Accordingly, it will be appreciated that the description above of encoding techniques and apparatus, which techniques and apparatus include a decoding path, are also relevant as examples of decoding techniques and apparatus.

The invention claimed is:

1. A video data decoding apparatus comprising:
   first circuitry configured to detect a control flag associated with at least a part of or present in at least a part of input data;
   second circuitry configured to determine whether the input data represents lossless encoded or lossy encoded video data;
   third circuitry configured to perform edge filtering of prediction samples of the input data and decoding of sample-based angular intra-prediction and residual differential pulse code modulation of the input data; and
   fourth circuitry configured to control, based on a state of the control flag and a lossless or lossy mode determined by the second circuitry, the third circuitry to:
      in a lossless mode and with an enable state of the control flag, enable sample-based angular intra-prediction and disable edge filtering of prediction samples, and with a disable state of the control flag, disable sample-based angular intra prediction and enable edge filtering of prediction samples, and
      in a lossy mode, and with a enable state of the control flag, enable residual differential pulse code modulation coding and enable edge filtering of prediction samples, and with a disable state of the control flag, disable residual differential pulse code modulation coding and enable edge filtering of prediction samples.

2. The video data decoding apparatus as claimed in claim 1, wherein the second circuitry determines whether the input data represents lossless or lossy video data based on a mode input signal.

3. The video data decoding apparatus as claimed in claim 1, wherein second circuitry determines whether the input data represents lossless or lossy video data based on detection of a mode input signal.

4. The video data decoding apparatus as claimed in claim 1, further comprising:
   output circuitry configured to output a decompressed video signal.

5. A display configured to display the decompressed video signal received from the output circuitry of the video decoding apparatus according to claim 4.

6. An electronic storage configured to store the decompressed video signal received from the output circuitry of the video decoding apparatus according to claim 4.

7. A receiver comprising:
   the video decoding apparatus according to claim 4.

8. A method comprising:
   detecting, via first circuitry, a control flag associated with at least a part of or present in at least a part of input data;
   determining, via second circuitry, whether the input data represents lossless encoded or lossy encoded video data;
   selectively performing, via third circuitry, edge filtering of prediction samples of the input data and decoding of sample-based angular intra-prediction and residual differential pulse code modulation of the input data; and
   control, based on a state of the control flag and a lossless or lossy mode determined by the second circuitry, the third circuitry to:
   in a lossless mode and with an enable state of the control flag, enable sample-based angular intra-prediction and disable edge filtering of prediction samples, and with a disable state of the control flag, disable sample-based angular intra prediction and enable edge filtering of prediction samples, and in a lossy mode, and with a enable state of the control flag, enable residual differential pulse code modulation coding and enable edge filtering of prediction samples, and with a disable state of the control flag, disable residual differential pulse code modulation coding and enable edge filtering of prediction samples.

9. The method as claimed in claim 8, wherein the determining determines whether the input data represents lossless or lossy video data based on a mode input signal.

10. The method as claimed in claim 8, wherein the determining determines whether the input data represents lossless or lossy video data based on detection of a mode input signal.

11. The method as claimed in claim 8, further comprising: outputting a decompressed video signal.

12. A non-transitory machine readable storage medium having stored there on machine readable instructions which when executed by a computer, cause the computer to perform the method according to claim 8.

\* \* \* \* \*

UNITED STATES PATENT AND TRADEMARK OFFICE
CERTIFICATE OF CORRECTION

PATENT NO. : 9,973,777 B2
APPLICATION NO. : 15/345702
DATED : May 15, 2018
INVENTOR(S) : Karl James Sharman et al.

It is certified that error appears in the above-identified patent and that said Letters Patent is hereby corrected as shown below:

On the Title Page

The Terminal Disclaimer Information has been omitted. Item (45) and the Notice information should read:

--(*) Notice: Subject to any disclaimer, the term of this patent is extended or adjusted under 35 U.S.C. 154(b) by 0 days.

This patent is subject to a terminal disclaimer--

--(45) Date of Patent: *May 15, 2018--

Signed and Sealed this
Fourteenth Day of May, 2019

Andrei Iancu
*Director of the United States Patent and Trademark Office*